United States Patent [19]

Carol, Jr. et al.

[11] 4,082,158
[45] Apr. 4, 1978

[54] DIFFERENTIAL PRESSURE POWER ROAD SPEED CONTROL SYSTEM

[75] Inventors: John A. Carol, Jr.; Wayne E. Paxton, both of Flint; John W. Riddel, Fenton, all of Mich.

[73] Assignee: General Motors Corporation, Detroit, Mich.

[21] Appl. No.: 632,398

[22] Filed: Nov. 17, 1975

[51] Int. Cl.² ............................................. B60K 31/00
[52] U.S. Cl. ................................. 180/108; 123/103 R
[58] Field of Search ..................... 180/108; 123/103 R, 123/103 A

[56] References Cited

U.S. PATENT DOCUMENTS

| | | | |
|---|---|---|---|
| 1,055,741 | 3/1913 | Halbleib | 180/105 R |
| 3,087,340 | 4/1963 | McMurray | 180/108 X |
| 3,088,538 | 5/1963 | Brennan | 180/108 |
| 3,524,516 | 8/1970 | Bemmann | 180/108 |
| 3,557,898 | 1/1971 | Emery | 123/103 X |
| 3,596,731 | 8/1971 | Fales | 180/108 |
| 3,921,751 | 11/1975 | Sakakibara | 123/103 R X |

Primary Examiner—Joseph F. Peters, Jr.
Assistant Examiner—John P. Silverstrim
Attorney, Agent, or Firm—D. D. McGraw

[57] ABSTRACT

A vehicle road speed control system in which the engine intake manifold pressure and the engine exhaust manifold pressure are utilized on opposite sides of a servomotor power wall to control the engine throttle and maintain a desired constant vehicle speed. The intake manifold pressure is normally subatmospheric and the exhaust manifold pressure is normally superatmospheric. Within the usual operating range of vehicle engine loads, the pressure difference between the two pressures remains substantially constant and provides a more uniform pressure differential than that provided in systems in which atmospheric pressure is the higher of the two pressures. The intake manifold pressure has a control valve in the conduit leading to the servomotor which varies the value of the pressure difference delivered to the servomotor in accordance with a control signal generated by a comparison of desired vehicle speed and actual vehicle speed.

5 Claims, 1 Drawing Figure

U.S. Patent
April 4, 1978
4,082,158
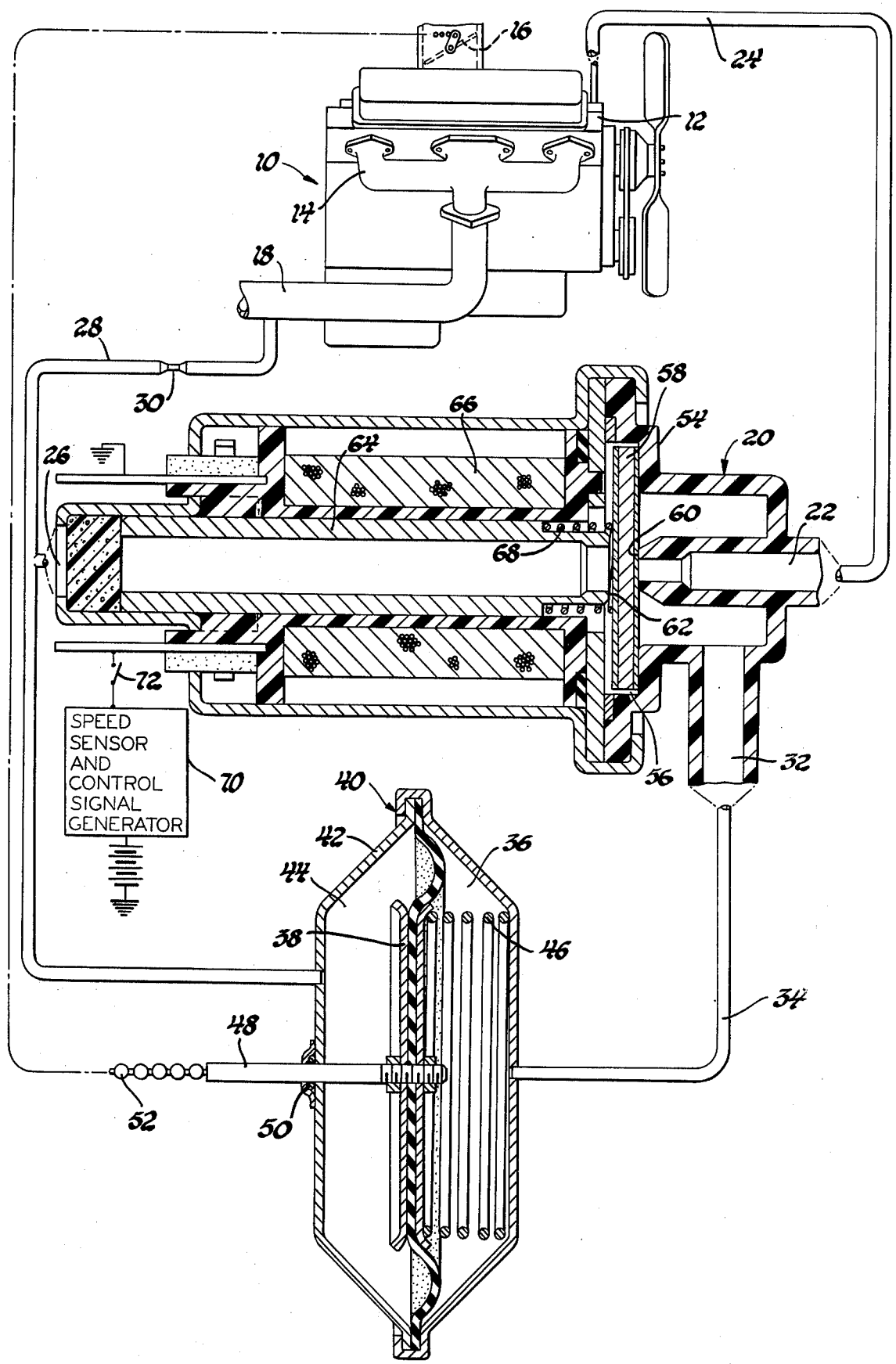

4,082,158

DIFFERENTIAL PRESSURE POWER ROAD SPEED CONTROL SYSTEM

The invention relates to a road speed control system, and more particularly to one utilizing a differential pressure power unit to increase the force available to actuate the engine throttle during high accelerations and at high altitudes. The invention utilizes the fact that at a substantially constant engine speed any variable causing intake manifold pressure to change also causes the engine exhaust back pressure to change so as to maintain a substantially constant pressure difference over various operating conditions. Therefore the pressure differential set up across the power wall of the power unit is derived from exhaust manifold pressure on one side and intake manifold on the other. This pressure difference can be used as a power source to drive the power unit power wall to whatever position is required to maintain vehicle speed, so long as the requirement is within the capability of the engine and travel of the power wall. Power units operating with atmospheric pressure and intake manifold vacuum to obtain the pressure difference may be limited to less than full power wall travel under some operating conditions such as higher altitudes and use with small engines. An output member connected to the power wall is movable by the power wall and is also connected to control the engine to maintain a desired road speed of the vehicle when the system is operative. A suitable pressure varying device responsive to a signal developed from actual road speed and desired road speed modifies the pressure difference to control the engine and keep the actual road speed substantially at the desired road speed under varying road load conditions. The invention also encompasses the method of operating a differential pressure actuated servomotor and thereby controlling a vehicle engine to control vehicle speed by generating a controllable pressure differential derived from a substantially constant pressure difference, applying the controlled pressure differential to a servomotor power wall so as to position the power wall in accordance with a desired vehicle speed as compared to actual vehicle speed to maintain the actual vehicle speed substantially at the desired vehicle speed under varying road load conditions. More particularly the method relates to generation and utilization of a controllable pressure difference derived from a superatmospheric fluid pressure and a subatmospheric fluid pressure, these pressures respectively being engine exhaust back pressure and engine intake manifold vacuum.

IN THE DRAWING:

The single FIGURE is a schematic representation of a vehicle road speed control system embodying the invention with parts broken away and in section.

The vehicle engine 10 is illustrated as being of the typical throttle valve controlled internal combustion engine having an intake manifold 12 and an exhaust manifold 14. The engine is schematically illustrated as being controlled by throttle valve 16 in a manner well known in the art. The exhaust manifold 14 is connected to deliver exhaust gases through the exhaust pipe 18 to atmosphere. The exhaust gases are at a superatmospheric pressure commonly referred to as exhaust back pressure. The pressure in the intake manifold 12 is at a subatmospheric pressure and is commonly referred to as intake manifold vacuum. In order to simplify the description of the direction of pressure changes, any changes in these pressures will be described in terms of absolute pressure.

A control valve assembly 20 acts as a pressure varying device. The assembly 20 has an inlet port 22 connected by conduit 24 to the engine intake manifold 12 to transmit intake manifold pressure to the valve assembly. Another inlet port 26 is connected by a conduit 28 to the exhaust manifold 14 through a restrictive orifice 30. The connection of conduit 28 so that it receives engine exhaust back pressure may be made to the exhaust pipe 18 as shown in the drawing, thereby operatively connecting conduit 28 to the exhaust manifold 14. Restrictive orifice 30 will act to limit transmission of exhaust back pressure fluctuations through conduit 28. The assembly 20 has an outlet port 32 which is connected by a conduit 34 to a power pressure chamber 36 on one side of a power wall 38 in a servomotor 40. The servomotor has a housing 42 which is divided by power wall 38 into power pressure chambers 36 and 44. A compression spring 46 is positioned in pressure chamber 36 and acts on power wall 38 to urge the wall in a direction tending to increase the volume of chamber 36 and decrease the volume of chamber 44. Output member 48 is connected to the power wall 38 and extends through chamber 44 and a seal 50 provided in housing 42. Output member 48 is connected exteriorly of housing 42 with the throttle valve 16 by a suitable connection such as bead chain 52 so that when the power wall 38 moves rightwardly as seen in the drawing the throttle valve 16 is moved in the open direction. A suitable throttle valve closing spring, not shown, is provided to continually urge the throttle valve toward the closed position. Conduit 28 is also connected with power chamber 44 in series with and downstream of orifice 30.

The control valve assembly 20 is the subject of copending Pat. application Ser. No. 632,399 (now U.S. Pat. No. 4,005,733) filed on even date herewith in the name of John W. Riddel, entitled "Pressure Control Valve" and assigned to the common assignee. The assembly 20 includes a housing 54 having a valve chamber 56 in which a magnetic reed dividing valve 58 is positioned. Inlet port 22 opens into chamber 56 through valve seat 60, which is engageable by valve 58. Another valve seat 62, positioned on the opposite side of valve 58 from seat 60, has inlet port 26 opening therethrough. Valve seat 62 is a part of an armature 64 of a solenoid 66. A spring 68 acts to continually urge valve 58 away from valve seat 62 and toward valve seat 60, tending to keep valve seat 60 closed. Fluid flow at this point is always in the direction tending to close valve seat 60 by its action on valve 58, independently of the action of spring 68. The solenoid 66 is electrically connected in a circuit having a suitable speed sensor and control signal generator 70. This mechanism senses vehicle road speed and is set at a desired vehicle speed. It generates a control signal which reflects the difference between the two speeds. This signal is delivered to solenoid 66 to energize and deenergize the solenoid in an appropriate duty cycle to move valve 58 and permit prescribed quantities of pressures entering ports 22 and 26 to be admitted to chamber 56. Outlet port 32 is connected to transmit the resultant control pressure from chamber 56 through conduit 34 to power pressure chamber 36 of the servomotor 40. In general, this pressure will be greater than the intake manifold pressure and usually, but not always, less than atmospheric pressure. It is therefore described herein as a modified pressure of the intake manifold pressure even though the modification is accomplished by bleeding prescribed timed quantities of exhaust manifold pressure into chamber 56.

When the vehicle in which engine 10 is installed is operating normally and the road speed control system is not energized, valve 58 keeps seat 60 closed. Therefore exhaust manifold pressure is transmitted to both pressure chambers 36 and 44 and there is no fluid pressure differential across power wall 38. Spring 46 therefore holds the power wall and its output member 48 in a leftward position, leaving the connection 52 slack so that throttle valve 16 is not effected by the system and can be manually controlled by the vehicle operator. When the system is energized, which may be accomplished by closing a switch 72 in the electrical circuit leading to solenoid 66, the control signal generated by mechanism 70 actuates the control valve assembly 20. A control pressure is therefore generated in chamber 56 which is transmitted to chamber 36 and is less than the pressure contained in chamber 44. The resultant pressure differential moves power wall 38 rightwardly to move output member 48 rightwardly and activate the connection 52 to the throttle valve 16. If at the time of energization the vehicle is at the desired road speed, this merely establishes a force which holds the throttle valve 16 at a position corresponding to that speed so that the vehicle operator can remove his foot from the accelerator pedal without changing the vehicle speed.

If the vehicle changes from a level road grade to an upgrade, additional engine power is required to maintain the vehicle at the set speed. The speed sensor of mechanism 70 will sense a slight change in actual vehicle road speed and the control signal generator will cause the duty cycle of solenoid 66 to be changed so that additional intake manifold pressure is admitted to chamber 56 relative to the exhaust manifold pressure admitted thereto. This will result in a decrease in the pressure in chamber 56 and chamber 36. This increases the pressure differential across power wall 38, moving the power wall and an output member 48 rightwardly to open throttle valve 16 to increase engine power. This operation will continue until the vehicle is again traveling at the desired road speed, within the capability of the engine and the control system. The changes in actual vehicle speed that take place are so slight that they are virtually unnoticed by the vehicle operator. The system operates similarly if the vehicle encounters a downgrade, resulting in a closing action of the throttle valve 16 to readjust the engine power so as to maintain the desired vehicle speed.

What is claimed is:

1. In an engine power control mechanism selectively maintaining a desired engine output,
    a system for operating a differential pressure operated servomotor by separate first and second pressures generated to maintain a substantially constant pressure differential therebetween throughout an operating range of engine load, said system comprising:
    an engine having a control device controlling engine speed and power, said engine generating separate fluctuating first and second pressures having a substantially constant pressure differential therebetween throughout an operating range of engine load;
    a servomotor having a housing, a power wall movable in said housing and dividing said housing into first and second power pressure chambers, an output member connected to said power wall and movable thereby and also connected to said engine control device to control said engine to modify engine power under selectively predetermined conditions to maintain a desired engine output;
    first means connecting said first pressure to said first power chamber and having a restrictive orifice therein;
    and second means including a pressure varying device responsive to said selectively predetermined conditions and to changing engine operating load demands to generate a controlled pressure from said first and second pressures, said second means connecting said controlled pressure to said second power chamber whereby said servomotor is actuated in accordance with the pressure differential across said power wall and controls the output of said engine by varying engine power to meet the changing engine operating load demands and maintain the desired engine output.

2. In an engine power control mechanism selectively maintaining a desired engine output,
    a system for operating a differential pressure operated servomotor by separate first and second pressures generated to maintain a substantially constant pressure differential therebetween throughout an operating range of engine load, said system comprising:
    an engine having a control device controlling engine speed and power, said engine generating separately a first superatmospheric fluid pressure constituting engine exhaust back pressure and a second subatmospheric fluid pressure constituting engine intake manifold vacuum, said pressures having a substantially constant absolute pressure differential therebetween;
    a servomotor having a housing, a power wall movable in said housing and dividing said housing into first and second power pressure chambers, and an output member connected to said power wall and movable thereby and also connected to said engine control device to control said engine upon demand to modify engine power to maintain a desired engine output;
    first means having a restrictive orifice therein and continually connecting said first pressure to said first power chamber;
    and second means including a second pressure varying device responsive to said demand and changing engine operating loads, said second means connecting said second pressure to said second power chamber and varying said second pressure delivered to said second power chamber as engine loads change whereby said servomotor is actuated in accordance with the pressure differential across said power wall to vary engine power in accordance with changing engine operating loads to maintain the desired engine output.

3. The method of operating a differential pressure actuated servomotor and thereby controlling a vehicle engine to control vehicle road speed, said method comprising:
    a. generating first and second fluid pressures having a substantially constant pressure difference throughout a range of vehicle engine loads substantially embracing the usual vehicle engine operational range of engine loads,
    b. restrictively applying the first fluid pressure to one side of the servomotor power wall,
    c. and modifying and applying the second fluid pressure to the opposite side of the servomotor power wall in accordance with a desired vehicle speed as compared to actual vehicle speed to maintain the actual vehicle speed substantially at the desired vehicle speed under varying road load conditions.

4. The method of operating a differential pressure actuated servomotor and thereby controlling a vehicle engine to control vehicle road speed, said method comprising:
- a. generating a first superatmospheric fluid pressure constituting engine exhaust back pressure and a second fluid pressure constituting engine intake manifold subatmospheric pressure having a substantially constant absolute pressure difference,
- b. restrictively applying the first fluid pressure to one side of the servomotor power wall,
- c. and modifying and applying the second fluid pressure to the opposite side of the servomotor power wall in accordance with a desired vehicle speed in relation to actual vehicle speed to maintain the actual vehicle speed substantially at the desired vehicle speed under varying road load conditions.

5. A road speed control system for a vehicle wherein a differential pressure operated servomotor operates to control vehicle road speed through the use of separate exhaust and intake manifold pressures generated by the vehicle engine with a substantially constant differential therebetween, said system comprising:

an engine controllable for generating separate exhaust and intake manifold pressures with a substantially constant pressure difference therebetween as engine load varies and as said pressures change due to factors other than engine load;

a servomotor having a housing, a power wall movable in said housing and dividing said housing into first and second power chambers, and an output member connected to said power wall and movable thereby to control said engine to provide a desired vehicle road speed;

first means continuously restrictively connecting said exhaust pressure to said first power chamber;

and second means selectively connecting said intake manifold pressure to said second power chamber, said second means including a pressure varying device having a pair of inlets connected respectively to said exhaust and intake manifold pressures and an outlet connected to said second power chamber and means proportionately connecting said inlets to said outlet in response to a signal generated by the comparison of desired vehicle road speed to actual vehicle road speed whereby said servomotor controls said engine as said power wall moves in response to the pressure differential across said power wall.

* * * * *